United States Patent
Jackan et al.

(10) Patent No.: US 10,697,479 B1
(45) Date of Patent: Jun. 30, 2020

(54) PRESSURE VESSEL AND METHOD OF WELDING A PRESSURE VESSEL SIDEWALL AND END CAP TOGETHER

(71) Applicant: JARP Industries, Inc., Schofield, WI (US)

(72) Inventors: Joseph W. Jackan, Eland, WI (US); Jeremy J. Gabor, Hatley, WI (US); Christopher J. Krzewina, Rothschild, WI (US)

(73) Assignee: JARP Industries, Inc., Schofield, WI (US)

( * ) Notice: Subject to any disclaimer, the term of this patent is extended or adjusted under 35 U.S.C. 154(b) by 88 days.

(21) Appl. No.: 15/967,655

(22) Filed: May 1, 2018

Related U.S. Application Data

(60) Provisional application No. 62/517,575, filed on Jun. 9, 2017.

(51) Int. Cl.
   *F15B 15/14* (2006.01)
   *B23K 101/12* (2006.01)

(52) U.S. Cl.
   CPC ...... *F15B 15/1428* (2013.01); *F15B 15/1438* (2013.01); *B23K 2101/12* (2018.08)

(58) Field of Classification Search
   CPC .. F15B 15/1428; F15B 15/1438; B23K 9/035; B23K 9/0358
   See application file for complete search history.

(56) References Cited

U.S. PATENT DOCUMENTS

| | | | | |
|---|---|---|---|---|
| 1,912,993 A | * | 6/1933 | Murray, Jr. | B23K 9/035 219/104 |
| 2,146,901 A | * | 2/1939 | Lane | B23K 9/035 228/139 |
| 2,258,913 A | * | 10/1941 | Stone | B23K 9/035 228/125 |
| 2,623,148 A | * | 12/1952 | Ronay | B23K 9/035 219/137 R |
| 2,646,995 A | * | 7/1953 | Thompson | B23K 9/0358 285/288.11 |

(Continued)

FOREIGN PATENT DOCUMENTS

| DE | 102013008351 B9 * | 10/2014 | |
| GB | 739908 A * | 11/1955 | ........... B23K 9/0282 |

(Continued)

*Primary Examiner* — Thomas E Lazo
(74) *Attorney, Agent, or Firm* — Merchant & Gould P.C.

(57) ABSTRACT

A pressure vessel includes: (a) a cylindrical sidewall having a wall thickness, an inside surface, an outside surface, and the cylindrical sidewall extending between a first end and a second end, wherein one of the first end or the second end includes a sidewall edge that forms part of an outwardly opening weld groove; (b) an end cap constructed to engage the cylindrical sidewall edge, the end cap comprising an end cap edge corresponding to the sidewall edge and that, when combined with the sidewall edge, forms the outwardly opening weld groove; (c) a cylindrically extending backer bar located in support of the outwardly opening weld groove formed by the sidewall edge and the end cap edge; and (d) a weld joint formed in the outwardly opening weld groove and holding the cylindrical sidewall to the end cap. A method for welding a pressure vessel sidewall and end cap together is provided.

22 Claims, 5 Drawing Sheets

(56) References Cited

U.S. PATENT DOCUMENTS

| | | | | |
|---|---|---|---|---|
| 2,847,958 A * | 8/1958 | Norton, Jr. | ............ | B23K 9/0358 228/50 |
| 2,945,942 A * | 7/1960 | Flynn | ..................... | B23K 33/00 219/137 R |
| 3,001,497 A * | 9/1961 | Thielsch | ................ | B23K 9/035 228/56.3 |
| 3,110,103 A * | 11/1963 | Davey | .................. | B23K 9/0358 228/164 |
| 3,581,039 A * | 5/1971 | Kanzaki | ................ | B23K 9/035 219/73 |
| 3,596,570 A * | 8/1971 | Kenyon | .............. | F15B 15/1438 92/168 |
| 4,303,005 A * | 12/1981 | Glomski | ................ | F15B 15/16 228/113 |
| 5,395,142 A * | 3/1995 | Horn | .................... | B23K 9/0358 228/50 |
| 5,487,326 A | 1/1996 | Owens | | |
| 5,990,441 A | 11/1999 | Zaenglein et al. | | |
| 6,180,919 B1 * | 1/2001 | Semenov | ............ | B23K 9/0026 219/137 WM |
| 6,439,103 B1 | 8/2002 | Miller | | |
| 6,637,315 B2 * | 10/2003 | Mickelson | .......... | F15B 15/1438 92/164 |
| 6,639,183 B2 | 10/2003 | Balogh et al. | | |
| 6,694,615 B2 * | 2/2004 | Mickelson | .............. | B23P 15/10 156/305 |
| 6,705,438 B2 | 3/2004 | Ananthanarayanan et al. | | |
| 6,946,221 B2 | 11/2005 | Mickelson et al. | | |
| 6,964,221 B2 * | 11/2005 | Mickelson | .............. | B23P 15/10 92/128 |
| 7,228,785 B2 | 6/2007 | Wilhelm et al. | | |
| 7,874,471 B2 * | 1/2011 | Fairchild | .............. | B23K 9/0282 228/112.1 |
| 2006/0042895 A1 | 3/2006 | Mangelschots et al. | | |
| 2016/0047472 A1 * | 2/2016 | Braun | ................. | F15B 15/1428 92/170.1 |

FOREIGN PATENT DOCUMENTS

| | | | |
|---|---|---|---|
| JP | 59039476 A | * | 3/1984 |
| JP | 2010242856 A | * | 10/2010 |

* cited by examiner

PRESSURE VESSEL AND METHOD OF WELDING A PRESSURE VESSEL SIDEWALL AND END CAP TOGETHER

CROSS-REFERENCE TO RELATED APPLICATIONS

This application claims the benefit of provisional patent Application Ser. No. 62/517,575 filed with the United States Patent and Trademark Office on Jun. 9, 2016. The entire disclosure of U.S. Application Ser. No. 62/517,575 is incorporated herein by reference.

FIELD OF THE DISCLOSURE

The present disclosure relates to a pressure vessel and to a method of welding a pressure vessel sidewall and end cap together. In particular, the pressure vessel can be a hydraulic cylinder having a piston therein and being ported for the flow of hydraulic fluid into and out of the hydraulic cylinder.

BACKGROUND

Hydraulic cylinders are typically subject to relatively large internal pressures. In order to handle these large internal pressures, the hydraulic cylinder end cap is welded to the hydraulic cylinder sidewall. Because of the high pressures experienced when using the hydraulic cylinder, it is desirable to avoid fatigue and failure of the weld joint during the useful life of the hydraulic cylinders. A common failure of hydraulic cylinders can be referred to as weld failure. Hydraulic fluid leaking from a weld joint is often a result of a weld failure. Accordingly, hydraulic cylinder designs that reduce the incidents of weld failure are desired.

Several weld designs for hydraulic cylinders are described. For example, see U.S. Pat. No. 6,946,221 to Mickelson et al., U.S. Pat. No. 6,694,615 to Mickelson, and U.S. Pat. No. 6,637,315 to Mickelson.

SUMMARY

A pressure vessel is provided by the present disclosure. The pressure vessel includes: (a) a cylindrical sidewall having a wall thickness, an inside surface, an outside surface, and the cylindrical sidewall extending between a first end and a second end, wherein one of the first end or the second end includes a sidewall edge that forms part of an outwardly opening weld groove; (b) an end cap constructed to engage the cylindrical sidewall edge, the end cap comprising an end cap edge corresponding to the sidewall edge and that, when combined with the sidewall edge, forms the outwardly opening weld groove; (c) a cylindrically extending backer bar located in support of the outwardly opening weld groove formed by the sidewall edge and the end cap edge; and (d) a weld joint formed in the outwardly opening weld groove and holding the cylindrical sidewall to the end cap.

A method for welding a pressure vessel side wall and end cap together is provided by the present disclosure. The method includes steps of: (a) welding a sidewall edge of cylindrical sidewall to an end cap edge by introducing molten metal into an outwardly opening weld groove formed by the sidewall edge and the end cap edge, wherein: (i) the cylindrical sidewall has a wall thickness, an inside surface, an outside surface, and the cylindrical sidewall extending between a first end and a second end, wherein one of the first end or the second end includes the sidewall edge that forms part of an outwardly opening weld groove; (ii) the end cap comprises an end cap edge corresponding to the sidewall edge and that, when combined with the sidewall edge, forms the outwardly opening weld groove; and (iii) a cylindrically extending backer bar located in support of the outwardly opening weld groove formed by the sidewall edge and the end cap edge; and (b) forming a weld joint in the outwardly opening weld groove and holding the cylindrical sidewall to the end cap.

DETAILED DESCRIPTION

The following description is exemplary in nature and is in no way intended to limit the invention, its application, or uses.

Figure 1:
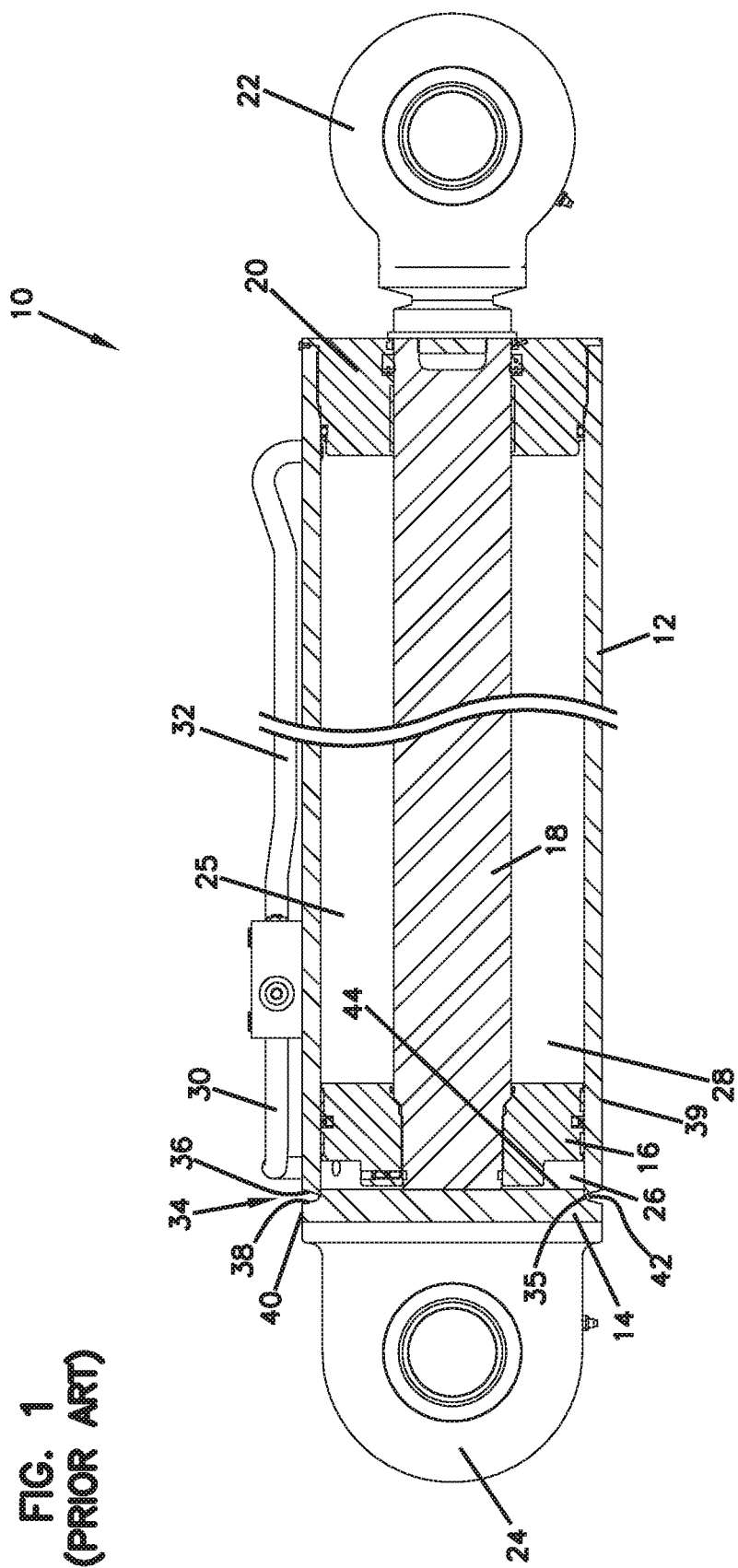
FIG. 1 is a sectional, assembly view of a prior art hydraulic cylinder illustrating how the end cap is welded onto the sidewall.

An exemplary prior art hydraulic cylinder is illustrated in FIG. 1 at reference number 10 and is provided in a sectional view. The hydraulic cylinder 10 includes a cylinder barrel or sidewall 12, and an end cap 14. Sliding within the cylinder barrel 12 is a piston 16, and extending from the piston 16 is a piston rod 18. The piston rod 18 passes through a gland 20 which is attached to an end of the cylinder barrel 12 opposite the end cap 14. Attached to the piston rod 18 opposite the piston 16 is a piston rod connector 22. The piston rod connector 22 is available for attachment to various items or tools for transmission of lineal force. An end cap connector 24 can be provided extending from the end cap 14, and is similarly available for attachment to a desired tool for the transmission of lineal force. The piston 16 divides the interior 25 of the hydraulic cylinder 10 into a first region 26 and a second region 28. Hydraulic fluid flowing into the first region 26 causes the piston 16 to move toward the gland 20, and hydraulic fluid flowing into the second region 28 causes the piston 16 to move toward the end cap 14. Similarly, hydraulic fluid leaves the first region 26 as the piston 16 moves toward the end cap 14, and hydraulic fluid leaves the second region 28 as the piston 16 moves toward the gland 20. A first hydraulic fluid line 30 is available for conveying hydraulic fluid to and from the first region 26, and a second hydraulic fluid line 32 is available for conveying hydraulic fluid to and from the second region 28.

The hydraulic cylinder 10 is illustrated with a weld groove 34 shown between the cylinder barrel 12 and the end cap 14. When the hydraulic cylinder is assembled and available for operation, the groove 34 is filled with molten metal to form a weld joint. In the location of the weld groove 34, the cylinder barrel 12 provides a sidewall edge 36, and the end cap 14 provides an end cap edge 38 along a periphery 40 of the end cap 14 that aligns with the sidewall edge 36 of the cylinder barrel 12. The edges 36 and 38 form the weld groove 34, and the weld groove 34 can be characterized as outwardly opening. The outwardly opening weld groove 34 can be characterized as having a pointed bottom 35 and the edges 36 and 38 can be provided slanting away from each other from the bottom 35 to the outside hydraulic cylinder surface 39. The weld groove bottom 35 includes a center 42. The end cap edge 38 along the periphery 40 of the end cap 14 is recessed from the interior surface 44 of the end cap 14, and the groove center 42 is shown located in extension over the end cap 14.

During the step of welding, the weld groove 14 is filled with molten metal and forms a weld joint. Over time and after repeated cycles by the hydraulic cylinder 10, there is a possibility that a crack may start to form along the inside of the cylinder wall 12 at the location of the endcap 14. Continued propagation of the crack can result in failure of the hydraulic cylinder.

Figure 2:
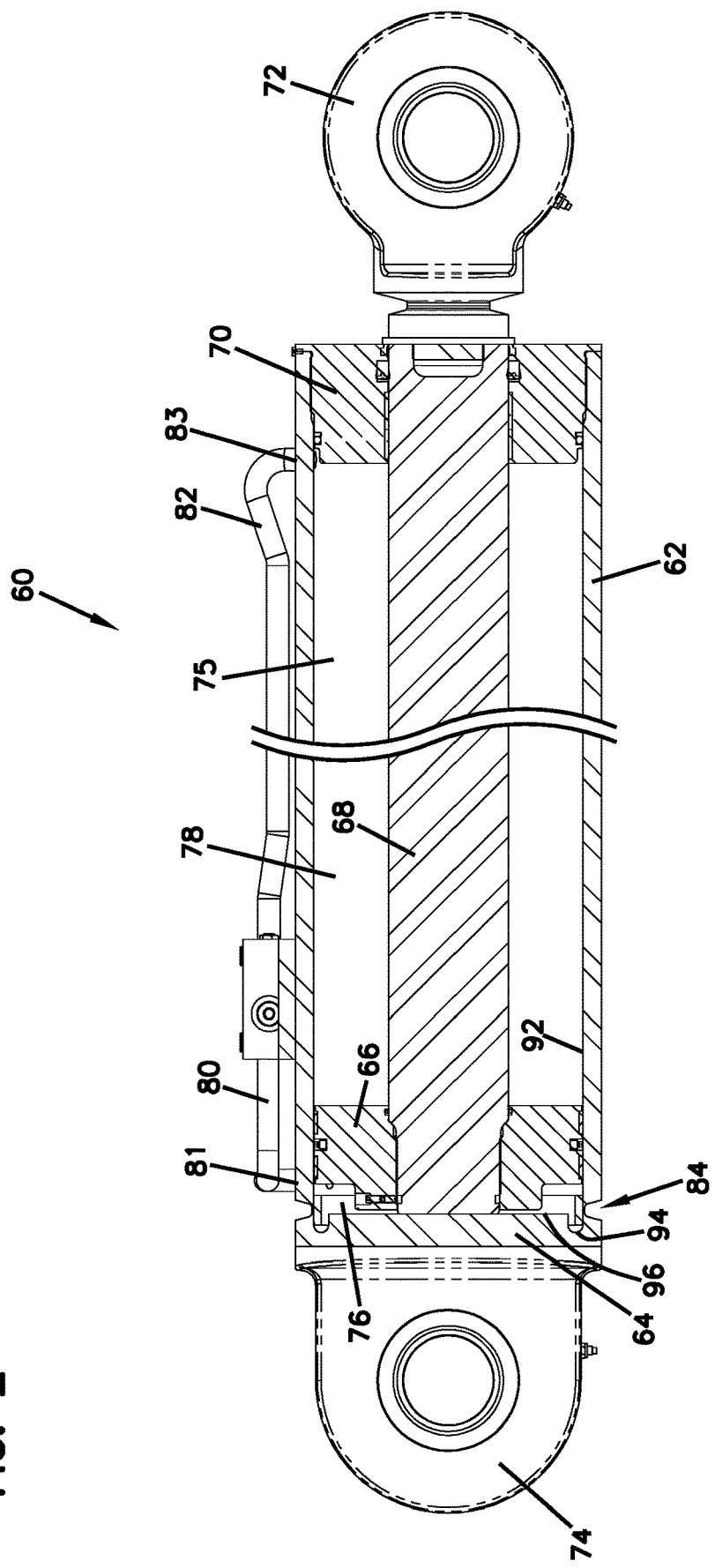
FIG. 2 is a sectional, assembly view of a hydraulic cylinder according to the principles of the present disclosure.

Now referring to FIG. 2, a hydraulic cylinder according to the present disclosure is shown at reference number 60. Similar to the hydraulic cylinder 10, the hydraulic cylinder 60 includes a cylinder barrel or sidewall 62 and an end cap 64. Sliding within the cylinder barrel 62 is a piston 66, and extending from the piston 66 is a piston rod 68. The piston rod 68 passes through a gland 70 which is attached to an end of the cylinder barrel 62 opposite the end cap 64. Attached to the piston rod 68 opposite the piston 66 is a piston rod connector 72. The piston rod connector 72 is available for attachment to various items or tools for transmission of lineal force. An end cap connector 74 can be provided extending from the end cap 64, and is similarly available for attachment to various items or tools for the transmission of lineal force. The piston 66 divides the interior 75 of the hydraulic cylinder 60 into a first region 76 and a second region 78. Hydraulic fluid flowing into the first region 76 cause the piston 66 to move toward the gland 70, and hydraulic fluid flowing into the second region 78 causes the piston 66 to move toward the end cap 64. Similarly, hydraulic fluid leaves the first region 76 as the piston 66 moves toward the end cap 64, and hydraulic fluid leaves the second region 78 as the piston 66 moves toward the gland 70. A first hydraulic fluid line 80 is available for conveying hydraulic fluid to and from the first region 76, and a second hydraulic fluid line 82 is available for conveying hydraulic fluid to and from the second region 78. The hydraulic cylinder 60 can be referred to as "ported" because the first hydraulic fluid line 80 connects to the first region via port 81 and the second hydraulic fluid line 82 connects to the second region via port 83.

Figure 3:
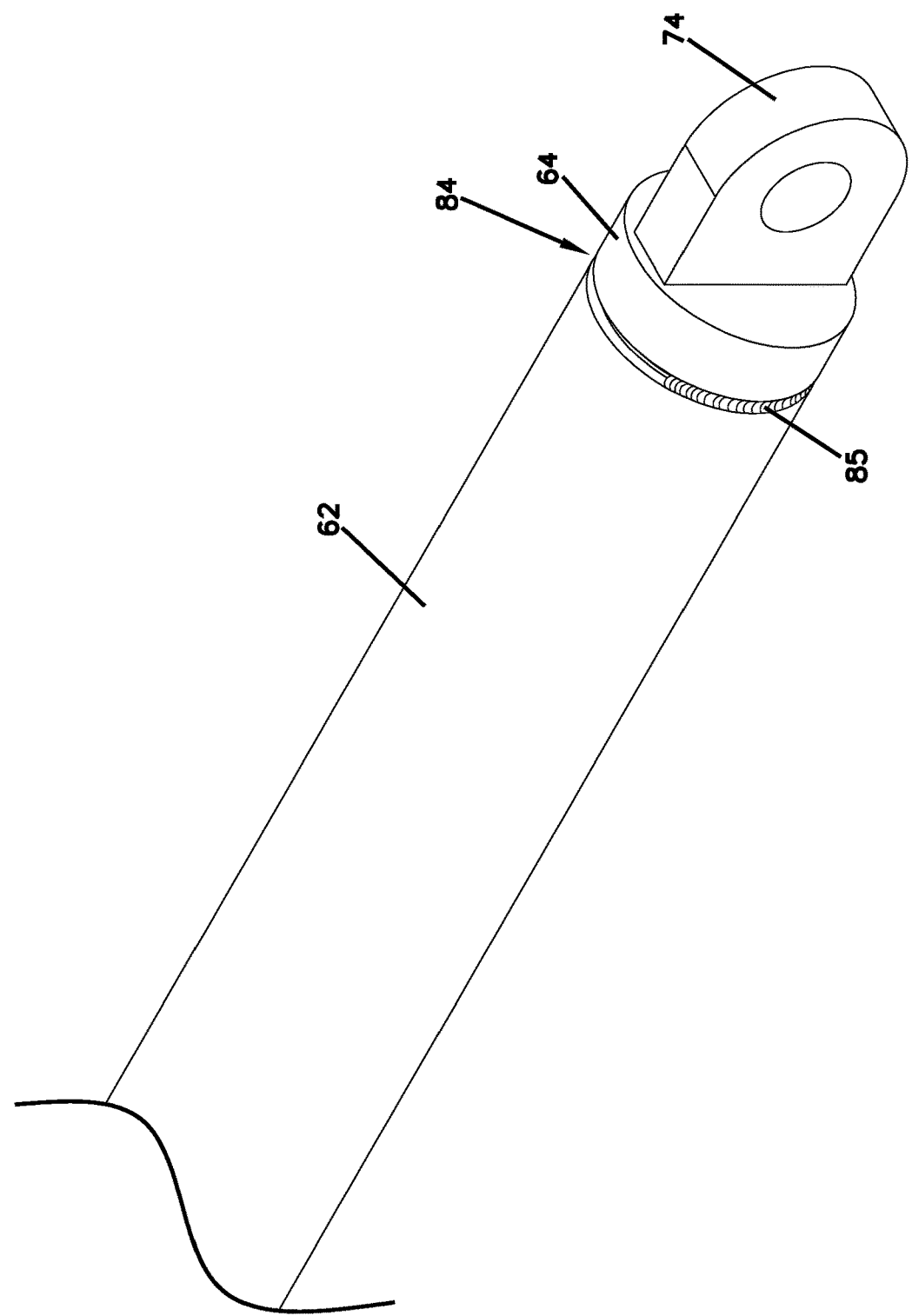
FIG. 3 is a perspective view of a portion of the hydraulic cylinder assembly according to FIG. 2.

The hydraulic cylinder 60 is illustrated with a weld groove 84 shown between the cylinder barrel 62 and the end cap 64. When the hydraulic cylinder is assembled and available for operation, the weld groove 84 is filled with molten metal to form a weld joint 85 (shown in FIG. 3). FIG. 3 is illustrated with a portion of the weld groove 84 free of metal, and a portion of the weld groove 84 filled with metal and forming a weld joint 85. While the hydraulic cylinder is shown in the drawings and described, at times, without metal filling the weld groove 84, this done for illustration. It should be understood that the hydraulic cylinder, when assembled for use, includes the weld groove 84 filled with metal as a result of welding to form the weld joint 85. Exemplary techniques for filling the weld groove 84 or for welding in general include wire feed welding and submerged arc welding. Furthermore, once the weld groove 84 is filled as a result of welding, the weld joint 85 can be virtually indistinguishable from a remainder of the sidewall 62 and the end cap 64. Of course, it may be possible for an experienced eye to detect the weld joint 85.

Figure 4:
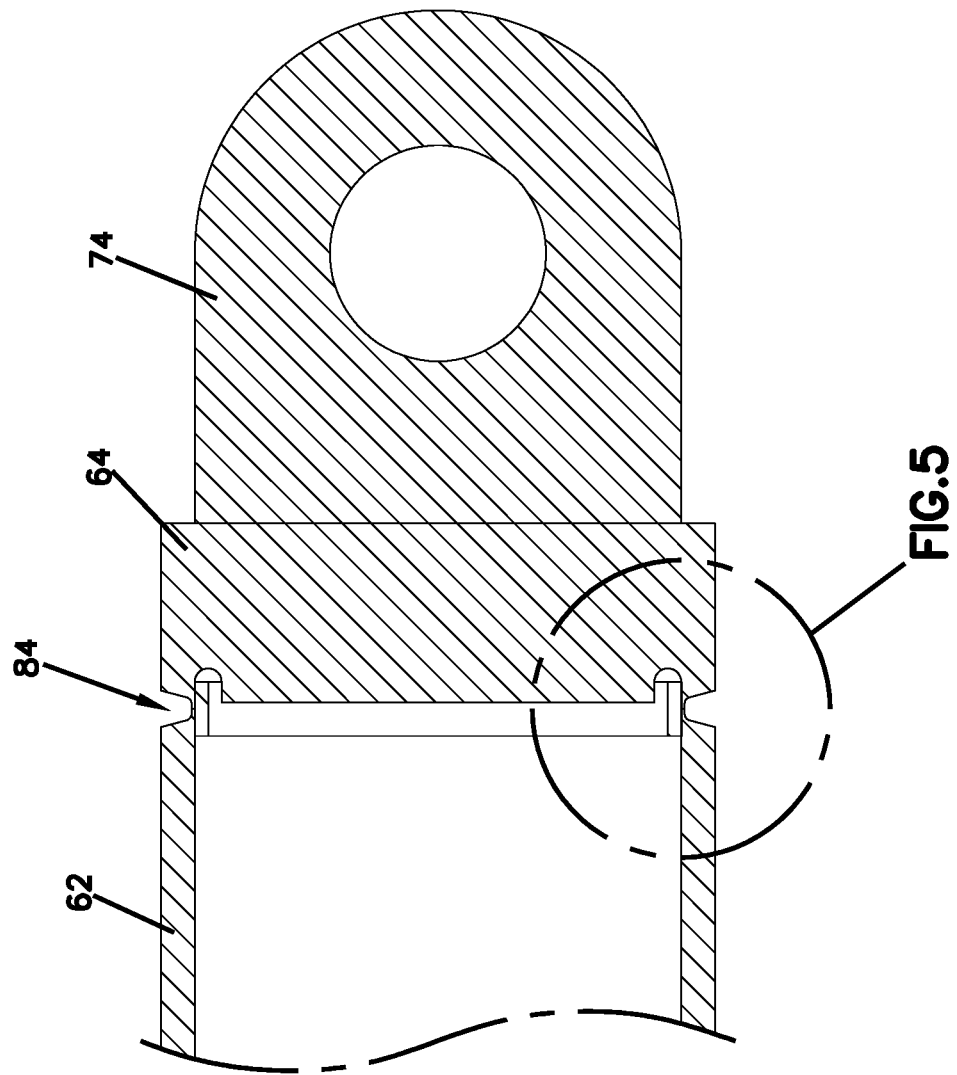
FIG. 4 is a sectional view of a portion of the assembly of FIG. 3.
Figure 5:
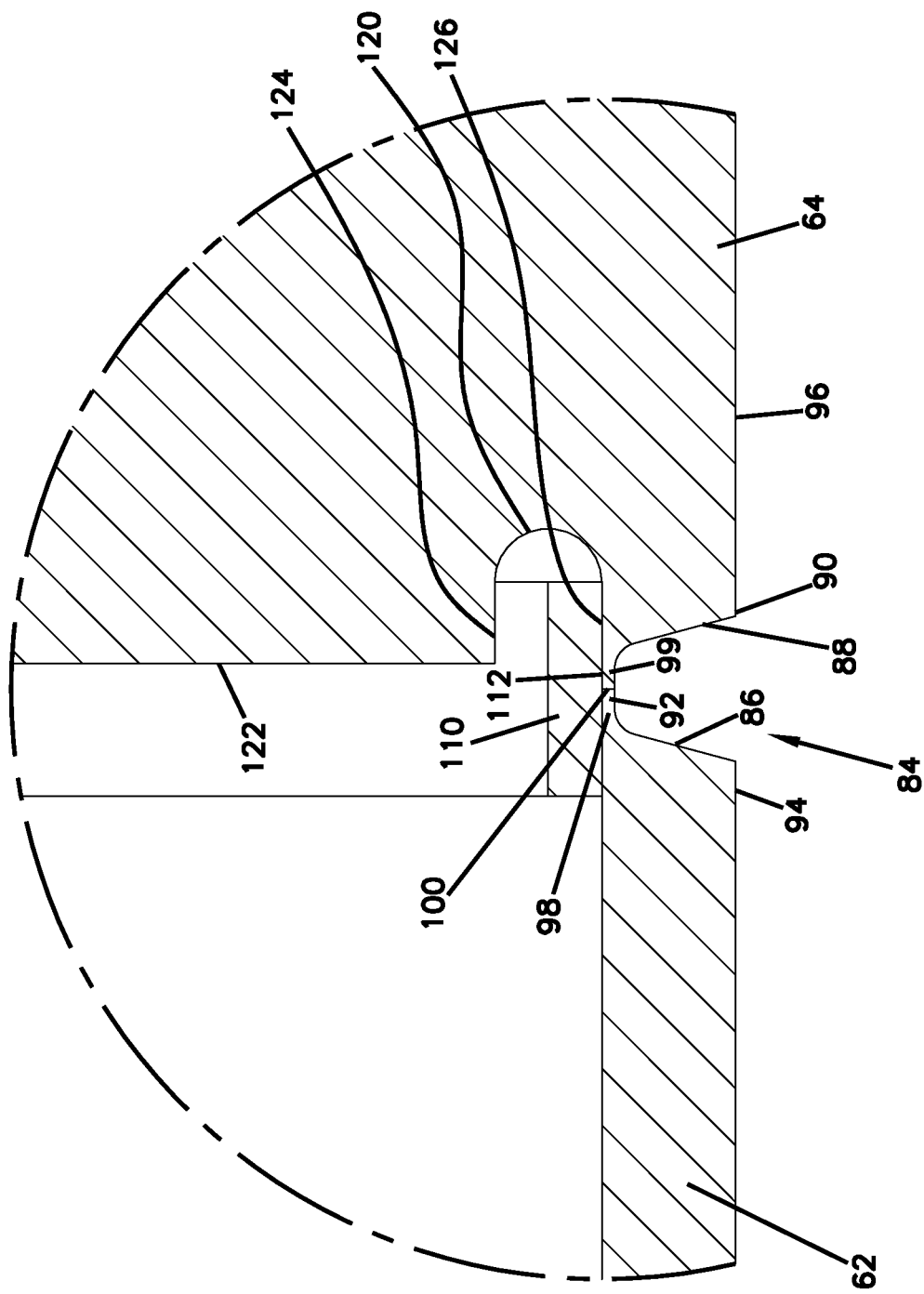
FIG. 5 is an exploded view of a portion of the assembly of FIG. 4.

Now referring to FIGS. 3-5, a portion of the hydraulic cylinder 60 is shown illustrating the weld groove 84 and the configuration resulting in the weld joint 85 after welding. In the location of the weld groove 84, the cylinder barrel 62 provides a sidewall edge 86, and the end cap 64 includes an end cap edge 88. The end cap edge 88 is provided along a periphery 90 of the end cap 64 that aligns with the sidewall edge 86 of the cylinder barrel 62. The sidewall edge 86 and the end cap edge 88 form the weld groove 84. The weld groove 84 can be provided having a V shape or having a U shape. In general, the weld groove 84 shown can be characterized as having a U shape with outwardly opening walls. In general, a U shape is desirable to provide a wide bottom of the groove that helps create a greater area or region for filling with molten metal. In addition, outwardly slanted walls also provide the groove with a greater surface area for attachment and also a wider outwardly opening groove. The sidewall edge 86 and the end cap edge 88 can be provided as straight or chamfered (or beveled). When provided as chamfered, it is desired for the edges to be recessed. In this context, the term "recessed" means that the portion that is chamfered or beveled is chamfered or beveled in a manner that forms an outwardly opening weld groove 84 from the bottom to the outside surface. In other words, the recess can be characterized as a recess in the outer surface of the sidewall relative to the inside surface of the sidewall, and can be characterized as a recess in the outer surface of the end cap relative to an inner portion of the end cap. As shown in FIG. 4, the weld groove 84 is provided as a curved or U-shaped groove that provides a relatively wide bottom of the weld groove 84. A wide bottom for the weld groove 84 is desirable because it creates a wider weld groove 84 for receipt of molten metal. The bottom of weld groove 84 can be referred to as the weld groove base 92. The weld groove base 92 is relatively thin but helps contain the molten metal. Accordingly, the edges 86 and 88 are shown extending from an outside surface 94 of the sidewall 62 or the outside surface 96 of the end cap 64, and extending in a chamfer or bevel toward legs 98 and 99. The legs 98 and 99 form the groove base 92. The center of the weld groove 84 along the groove base 92 can be referred to as the groove center 100. In the case of the weld groove 84 shown in FIG. 5, the groove center 100 is at the location where the legs 98 and 99 meet. In alternative designs, the weld center is not necessarily located where the cylinder barrel 62 and the end cap 64 meet.

Beneath the weld groove 84 is a backer bar 110. The backer bar 110 becomes part of the weld joint as the weld groove 84 is filled with molten metal and the groove base 92 and the backer bar 110 melt. Accordingly, the thickness of the groove base 92 should be sufficient so that it melts during the welding operation and thereby becomes welded to the backer bar 110. The groove base 92 should not be so thick that it does not melt and does not weld to the backer bar 110. The thickness of the groove base 92 should be sufficient to form the weld groove 84 and to locate the backer bar 110 in contact with the groove base, for example, as shown in FIG. 5. In addition, the groove base 92 should be sufficiently thin so that it melts along with at least a portion of the backer bar 110 during the step of welding to form the weld joint 85. The thickness of the groove base 92 can be selected depending on the power of the welding process. That is, a more powerful welding process may permit a thicker groove base 92. Preferably, the groove base 92 has a thickness of about 0.060 inch to about 0.090 inch at the location where it is intended to melt and weld to the backer bar 110. The backer bar 110 can be provided as a continuous structure supporting the groove base 92, and can be provided with an interference fit with the interior surface 112 of the groove base 92. The interference fit can be provided as about 0.002 inch to about 0.003 inch. In addition, the backer bar 110 can be received within a backer bar groove 120 along the interior face 122 of the end cap 64. Accordingly, the interior face 122 provides a backer bar groove 120 sufficiently deep to receive the backer bar 110. The backer bar groove 120 can include an inside groove surface 124 and an outside groove surface 126. The outside groove surface 126 corresponds to the inner surface 112 so that there in an interference fit with the backer bar 110. The interference fit can be about 0.002 inch to about 0.003 inch.

To further help relieve the stresses on the weld joint between the side wall 62 and the end cap 64, the groove center 100 can be located so that it is not directly over the end cap 64. By way of comparison, the groove center 42 shown in FIG. 1 is provided in alignment with a portion of the end cap 14. In contrast, the groove center 100 shown in FIG. 5 is located so that it is not in alignment with the end cap 64. That is, the groove center 100 is located extending beyond the interior face 122 of the end cap 64.

The above specification provides a complete description of the manufacture and use of the device and method of the invention. Since many embodiments of the invention can be made without departing from the spirit and scope of the invention, the invention resides in the claims hereinafter appended.

What is claimed is:

1. A pressure vessel comprising:
   (a) a cylindrical sidewall having a wall thickness, an inside surface, an outside surface, and the cylindrical sidewall extending between a first end and a second end, wherein one of the first end or the second end includes a sidewall edge that forms part of an outwardly opening weld groove;
   (b) an end cap constructed to engage the cylindrical sidewall edge, the end cap comprising an end cap edge corresponding to the sidewall edge and that, when combined with the sidewall edge, forms the outwardly opening weld groove;
   (c) a cylindrically extending backer bar located in support of the outwardly opening weld groove formed by the sidewall edge and the end cap edge, and wherein a portion of the cylindrical sidewall and a portion of the end cap form a weld groove base of the outwardly opening weld groove and engages the cylindrically extending backer bar; and
   (d) a weld joint formed in the outwardly opening weld groove and holding the cylindrical sidewall to the end cap.

2. A pressure vessel according to claim 1 wherein:
   (a) the groove base has a thickness of about 0.060 inch to about 0.090 inch prior to welding.

3. A pressure vessel according to claim 1 wherein:
   (a) the cylindrically extending backer bar forms part of the weld joint.

4. A pressure vessel according to claim 1 wherein:
   (a) the end cap includes an end face forming an interior surface of the pressure vessel and a cylindrical groove provided in the end face of the end cap, and wherein the cylindrical groove is constructed to receive the cylindrically extending backer bar.

5. A pressure vessel according to claim 1 further comprising:
   (a) a piston constructed to move along the inside surface of the cylindrical sidewall between the end cap and an opposite end cap located at the other of the first end or the second end.

6. A pressure vessel according to claim 5 wherein:
   (a) the second end cap comprises a gland and is constructed to receive a piston rod therethrough.

7. A pressure vessel according to claim 6 wherein:
   (a) the piston rod extends from the piston.

8. A pressure vessel according to claim 5 wherein:
   (a) the piston divides an interior of the pressure vessel into a first region and a second region.

9. A pressure vessel according to claim 8 wherein:
   (a) the first region is ported via a first hydraulic line for flowing hydraulic fluid into and out of the first region.

10. A pressure vessel according to claim 8 wherein:
    (a) the second region is ported via a second hydraulic line for flowing hydraulic fluid into and out of the second region.

11. A pressure vessel according to claim 1 wherein:
    (a) a center of the outwardly opening weld groove is located inwardly of an interior face of the end cap, wherein the interior face of the end cap forms part of an interior of the pressure vessel.

12. A method for welding a pressure vessel sidewall and end cap together, the method comprising:
    (a) welding a sidewall edge of cylindrical sidewall to an end cap edge by introducing molten metal into an outwardly opening weld groove formed by the sidewall edge and the end cap edge, wherein:
       (i) the cylindrical sidewall has a wall thickness, an inside surface, an outside surface, and the cylindrical sidewall extending between a first end and a second end, wherein one of the first end or the second end includes the sidewall edge that forms part of an outwardly opening weld groove;
       (ii) the end cap comprises an end cap edge corresponding to the sidewall edge and that, when combined with the sidewall edge, forms the outwardly opening weld groove;
       (iii) a cylindrically extending backer bar located in support of the outwardly opening weld groove formed by the sidewall edge and the end cap edge; and
       (iv) a portion of the cylindrical sidewall and a portion of the end cap form a weld groove base of the outwardly opening weld groove and engages the cylindrically extending backer bar;
    (b) forming a weld joint in the outwardly opening weld groove and holding the cylindrical sidewall to the end cap.

13. A method for welding a pressure vessel sidewall and end cap together according to claim 12 wherein:
    (a) the groove base has a thickness of about 0.060 inch to about 0.090 inch.

14. A method for welding a pressure vessel sidewall and end cap together according to claim 12 wherein:
    (a) the cylindrically extending backer bar forms part of the weld joint.

15. A method for welding a pressure vessel sidewall and end cap together according to claim 12 wherein:
    (a) the end cap includes an end face forming an interior surface of the pressure vessel and a cylindrical groove provided in the end face of the end cap, and wherein the cylindrical groove is constructed to receive the cylindrically extending backer bar.

16. A pressure vessel comprising:
(a) a cylindrical sidewall having a wall thickness, an inside surface, an outside surface, and the cylindrical sidewall extending between a first end and a second end, wherein one of the first end or the second end includes a sidewall edge that forms part of an outwardly opening weld groove;
(b) an end cap constructed to engage the cylindrical sidewall edge, the end cap comprising an end cap edge corresponding to the sidewall edge and that, when combined with the sidewall edge, forms the outwardly opening weld groove;
(c) a cylindrically extending backer bar located in support of the outwardly opening weld groove formed by the sidewall edge and the end cap edge,
(d) the end cap includes an end face forming an interior surface of the pressure vessel and a cylindrical groove provided in the end face of the end cap, and wherein the cylindrical groove is constructed to receive the cylindrically extending backer bar; and
(e) a weld joint formed in the outwardly opening weld groove and holding the cylindrical sidewall to the end cap.

17. A pressure vessel according to claim 16 wherein:
(a) a portion of the cylindrical sidewall and a portion of the end cap form a weld groove base of the outwardly opening weld groove and engages the cylindrically extending backer bar.

18. A pressure vessel according to claim 16 wherein:
(a) the cylindrically extending backer bar forms part of the weld joint.

19. A pressure vessel according to claim 16 further comprising:
(a) a piston constructed to move along the inside surface of the cylindrical sidewall between the end cap and an opposite end cap located at the other of the first end or the second end.

20. A pressure vessel according to claim 19 wherein:
(a) the second end cap comprises a gland and is constructed to receive a piston rod therethrough, the piston rod extends from the piston, the piston divides an interior of the pressure vessel into a first region and a second region, the first region is ported via a first hydraulic line for flowing hydraulic fluid into and out of the first region, and the second region is ported via a second hydraulic line for flowing hydraulic fluid into and out of the second region.

21. A pressure vessel according to claim 16 wherein:
(a) a center of the outwardly opening weld groove is located inwardly of an interior face of the end cap, wherein the interior face of the end cap forms part of an interior of the pressure vessel.

22. A method for welding a pressure vessel sidewall and end cap together, the method comprising:
(a) welding a sidewall edge of cylindrical sidewall to an end cap edge by introducing molten metal into an outwardly opening weld groove formed by the sidewall edge and the end cap edge, wherein:
(i) the cylindrical sidewall has a wall thickness, an inside surface, an outside surface, and the cylindrical sidewall extending between a first end and a second end, wherein one of the first end or the second end includes the sidewall edge that forms part of an outwardly opening weld groove;
(ii) the end cap comprises an end cap edge corresponding to the sidewall edge and that, when combined with the sidewall edge, forms the outwardly opening weld groove;
(iii) a cylindrically extending backer bar located in support of the outwardly opening weld groove formed by the sidewall edge and the end cap edge; and
(iv) the end cap includes an end face forming an interior surface of the pressure vessel and a cylindrical groove provided in the end face of the end cap, and wherein the cylindrical groove is constructed to receive the cylindrically extending backer bar; and
(b) forming a weld joint in the outwardly opening weld groove and holding the cylindrical sidewall to the end cap.

* * * * *